HEAT PUMP CONTROLS

Original Filed April 17, 1964

INVENTOR
Harry W. Jobes

ATTORNEYS

INVENTOR
Harry W. Jobes

BY Strauch, Nolan & Neale

ATTORNEYS

INVENTOR
HARRY W. JOBES

BY Strauch, Nolan & Neale
ATTORNEYS

INVENTOR

HARRY W. JOBES

BY Strauch, Nolan + Neale

ATTORNEYS

United States Patent Office

Re. 26,596
Reissued June 3, 1969

26,596
HEAT PUMP CONTROLS

Harry W. Jobes, Hollywood, Fla., assignor to Hupp Corporation, Cleveland, Ohio, a corporation of Delaware Original No. 3,273,635, dated Sept. 20, 1966, Ser. No. 363,050, Apr. 17, 1964, which is a continuation-in-part of application Ser. No. 141,151, Sept. 27, 1961. Application for reissue Sept. 20, 1967, Ser. No. 669,989
Int. Cl. F28f *17/00*
U.S. Cl. 165—12 11 Claims

Matter enclosed in heavy brackets [ ] appears in the original patent but forms no part of this reissue specification; matter printed in italics indicates the additions made by reissue.

*ABSTRACT OF THE DISCLOSURE*

*Control system for defrosting a heat pump in which the heat pump is periodically conditioned by a timer mechanism to initiate a defrost cycle, the defrost cycle being initiated and maintained only when the pressure of the refrigerant in the outdoor coil or the temperature of the outdoor coil is below a predetermined level. The defrost cycle is terminated within a predetermined time regardless of the condition of the outdoor coil.*

This application is a continuation-in-part of Serial No. 141,151 filed September 27, 1961 for Heat Pump Controls and now abandoned.

This invention relates to heat pump control apparatus and more particularly to apparatus for controlling the defrost cycle of heat pumps.

As is well known in the art, heat pumps comprise indoor and outdoor coils connected in a closed refrigerant circuit. Refrigerant is circulated through the coils by a compressor which draws the refrigerant from one coil, compresses the refrigerant and delivers the compressed refrigerant to the other coil where it is condensed and passes through a capillary tube or expansion valve to the first coil for evaporation. The system includes a suitable change-over valve mechanism for reversing the functions of the indoor and outdoor coils permitting the indoor coil to function as the evaporator for summertime cooling or as the condenser for wintertime heating, the outdoor coil performing the opposite function.

When heat pumps are employed for heating and the outdoor coil functions as the evaporator, there is a tendency for frost to form on the outdoor coil. The frost formation is rather rapid when the temperature of the outdoor coil falls below 32° F. or when the outdoor ambient temperature falls below 45° F. Since frost formation, if allowed to proceed, rapidly reduces the efficiency of the unit and may eventually render the unit inoperative, it is necessary to defrost the outdoor coil periodically. Generally, this defrosting is accomplished by operating the change-over valve to reverse the flow of refrigerant to direct the relatively hot gas delivered by the compressor directly to the outdoor coil. Many proposals have been made for automatically initiating and terminating the defrost cycle. While certain of these proposals effectively accomplish the defrost cycle, they are often unduly complicated and lack reliability. A major disadvantage of prior systems is their failure to discontinue the defrost cycle when the defrosting and evaporation of coil moisture has been completed. Prior systems in which the defrost cycle is initiated and discontinued periodically by a clock mechanism often operate the mechanism through a defrost cycle when defrosting is not required and continue the defrost cycle for its full predetermined time even though the defrosting has been effected in a fraction of the time allotted for it. The disadvantages of such systems are obvious since when the heat pump is operated on the defrost cycle, it is not effective for its intended purpose.

With these considerations in mind, it is a principal purpose and object of the present invention to provide improved defrost cycle controls for heat pumps which eliminate the disadvantages of the prior systems and eliminate needless defrost cycles inherent in prior clock operated systems and which defrost and dry the coil surfaces with increased efficiency.

It is a further object of the present invention to provide improved heat pump controls which prevent the build-up of excessive pressures in the system which are caused in prior units by continuing the defrost cycle after the evaporator coils are free of ice and moisture.

It is an additional object of the present invention to provide improved heat pump controls which provide a gain in overall operating capacity for the heat pump by completing the defrost and moisture disposal cycle in the shortest possible time.

It is a further object of the present invention to provide improved heat pump controls which are of relatively simplified and inexpensive construction and which have an extended trouble-free service life.

In attaining these and other objects, the present invention provides heat pump control systems which effectively control the normal operation of the heat pump including the change-over mechanism between heating and cooling cycles and which include a timer mechanism for periodically conditioning the control system for the initiation of the defrost cycle. Means responsive to the pressure of the refrigerant in the outdoor coil or the temperature of the outdoor coil is provided to prevent initiation of the defrost cycle if it is not needed and to discontinue the defrost cycle and return the heat pump to normal operation when the pressure of the refrigerant in the outdoor coil or the temperature of the outdoor coil has risen to a level which indicates that the evaporator coil has been defrosted and dried. The control systems of the present invention also include means for discontinuing the defrost cycle a predetermined time after it is initiated regardless of the condition of the outdoor coil.

Additional objects of the present invention will become apparent as the description proceeds in connection with the accompanying drawings in which:

FIGURE 6 illustrates diagrammatically a control system like that of FIGURE 5 but adapted for use with the apparatus of FIGURE 2.

Figure 1:
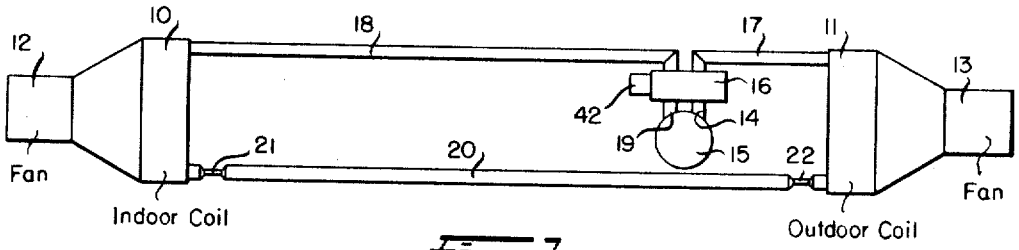
FIGURE 1 illustrates diagrammatically a typical heat pump unit to which the control system of the present invention may be applied.

The heat pump illustrated in FIGURE 1 is but one of many conventional systems to which the invention may be applied. It will be understood that the system shown in FIGURE 1 is simplified, only the major components which are necessary to an understanding of the present invention being shown. Essentially, the system comprises an indoor coil 10 and an outdoor coil 11 over which air is caused to pass by an indoor fan 12 and an outdoor fan 13. The discharge line 14 leading from the compressor 15 is adapted to be connected through a conventional solenoid operated change-over valve 16 either to a conduit 17 leading to the outdoor coil 11 or conduit 18 leading to the indoor coil 10. The change-over valve 16 is so constructed as to connect the compressor suction line 19 to the conduit 18 when the line 14 is connected to the conduit 17 and vice versa. Preferably the refrigerant circuit is completed by a conduit 20 connecting the coils 10 and 11, the conduit including divided capillary sections 21 and 22 but the invention may also be applied to systems employing a single capillary, thermal expansion valve, automatic expansion valves, etc. The change-over valve 16, which is of conventional construction is of the type which has its pilot valve spring-biased to a position which causes the main valve to move to the cooling cycle position and when pilot valve solenoid is energized it causes the main valve to move to the heating cycle position.

When the unit is operated on the cooling cycle, the indoor coil will function as the evaporator and the outdoor coil will function as the condenser. On this cycle the conduits 14 and 17 will be connected and the conduits 18 and 19 will be coil connected so that the compressed refrigerant passes to the outdoor coil 11 where it is condensed and then passes through the conduit 20 and the capillaries for evaporation in coil 10. On the heating cycle, the refrigerant passes through the conduits 14 and 18 to be condensed in the indoor coil 10 and then passes through the conduit 20 and the capillaries for evaporation in the outdoor coil 11. The refrigerant then returns through the conduits 17 and 19 to the compressor.

Figure 2:
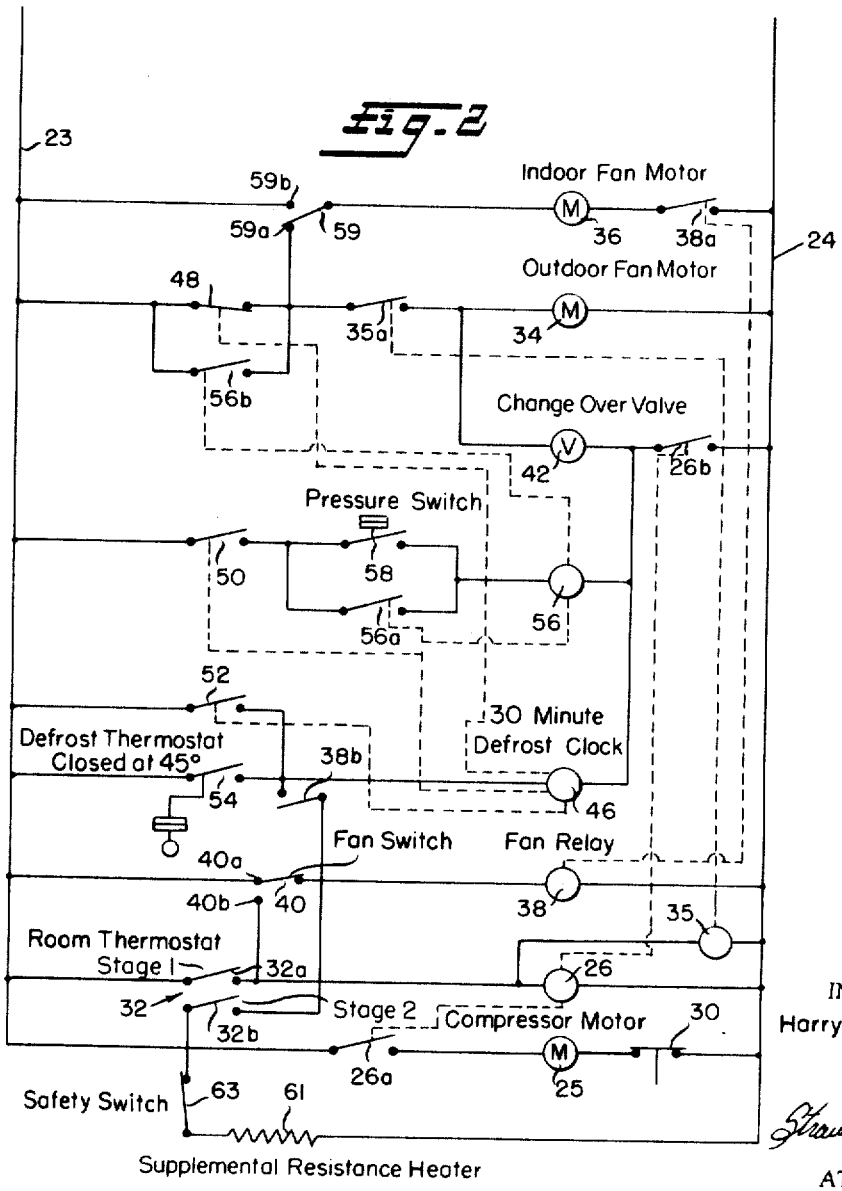
FIGURE 2 is a circuit diagram of the novel control system.

Referring now to FIGURE 2, which illustrates one form of control circuit for the apparatus of FIGURE 1, the main electrical power lines for the heat pump per se and the control apparatus are indicated at 23 and 24. The compressor motor 25 is connected to the main lines through normally open contacts 26a of a relay 26 and a conventional overload switch 30. The relay 26 is connected in series with a conventional two stage indoor thermostat 32. The motor 34 for the outdoor fan 13 is in series with contacts 35a of a relay 35 incorporated in the compressor circuit to switch off the indoor fan when the compressor is stopped.

The indoor fan 12 is operated by a motor 36 connected in series with contacts 38a of a fan relay 38 which is in turn connected in series with a manually operable fan switch 40. The fan switch is preferably provided with contacts 40a and 40b to connect the relay directly to the power lines or to place the relay in series with the first stage contacts 32a of room thermostat 32. The solenoid 42 of the change-over valve is in series with contacts 26b of relay 26. A defrost cycle clock 46, which is preferably a thirty-minute time clock, is also of essentially conventional construction and is provided with a cam (not shown) which operates switch contacts 48, 50 and 52, the contacts 48 being normally closed and the contacts 50 and 52 being normally open. On one side the clock is connected in series with contacts 26b of relay 26. At its opposite side the clock is connected to the power line 23 either through the contacts 52 or a defrost thermostat 54. The thermostat 54 which senses outdoor ambient temperatures is set to close at 45° F. and remain open at all temperatures above 45° F. The clock operated switch 50 is connected to a defrost relay 56 either through a defrost pressure switch 58 or contacts 56a of the relay 56, the circuit through the defrost relay 56 being completed through contacts 26b of relay 26.

A pressure switch 58 is connected to sense the pressure of the refrigerant in the outdoor coil 11 and in a typical case closes at a pressure of 170 p.s.i. and opens at a pressure of 100 p.s.i. The clock operated contacts 48 are connected in parallel with contacts 56b of the defrost relay 56 and the contacts 48 and 56b are each connected in series with the outdoor fan motor 34 and the solenoid 42 of the change-over valve.

A switch 59 having contacts 59c and 59b is provided to permit connection of the indoor fan motor 36 to the power lines 23 and 24 or to place the motor in series with the contacts 48 and 56b.

A supplemental resistance heater 61 positioned adjacent the indoor coil for supplying additional indoor heat is connected in series with a protective contact switch 63, the second stage contacts 32b of thermostat 32, contacts 38b of indoor fan relay 38, the thermostat 54 and the contacts 52.

The operation of the control system will now be described under different operating conditions. First, let it be assumed that the heat pump is being operated on the heating cycle and the outdoor ambient temperature is above 45° F. Experience has shown that under these conditions there is little danger of the accumulation of frost on the outdoor coils. The indoor heating thermostat 32 will close whenever heat is desired energizing relay 26 and closing contacts 26a and 26b placing the compressor 15 and the outdoor fan 13 in operation and energizing the change-over valve 16 to operate the heat pump on the heating cycle. At the same time contact 40a of the manual fan switch 40 will be closed energizing the fan relay 38, closing the relay contacts 38a and 38b and energizing the indoor fan motor through the contacts 38a, the normally closed timed contacts 48 and contact 59a of manual switch 59. Since the timed contacts 50 and 52 and the contacts of the thermostat 54 will be open, the defrost clock 46, the defrost relay 56 and the auxiliary heater 61 will not be energized. If the outdoor temperature falls below 45° and the indoor temperature falls sufficiently to close contacts 32b, the heater 61 will be placed in operation. Operation of the system continues in this manner until the requirements for heat have been satisfied at which time the contacts of the thermostat 32 will open, de-energizing the compressor, outdoor fan, the change-over valve and the auxiliary heater 61. The indoor fan will continue to run until the switch 40 is opened manually. Alternately by closing contacts 40b and 59b the indoor fan can be made to operate only when the thermostat 32 is closed.

When the heat pump assembly is being operated on the heating cycle and the outdoor ambient temperature drops below 45° F., the thermostatic contacts 54 will be closed energizing the defrost clock 46. It will be noted that the defrost clock 46 can be operated only when the contacts 26b of relay 26 are closed, i.e., when the compressor is energized and the system is in operation. The energization of the clock 46 will produce no change in the operation of the system until the clock has run for a total of thirty minutes after completion of the previous defrost cycle. When this time has elapsed, the clock will operate a cam to open contacts 48 and close contacts 50 and 52. The closing of contacts 52 assures continued operation of the clock 46 even though the defrost thermostat 54 opens.

When the contacts 48 are opened by the clock, the operation of the outdoor fan motor 34 is discontinued and the circuit to the change-over valve solenoid 42 is interrupted thus permitting the change-over valve to shift to the cooling cycle position. The operation of the indoor fan motor 36 will also be discontinued if the switches 40 and 59 are in the position shown in FIGURE 2. Since the auxiliary heater will be energized upon the fall in indoor temperature caused by operation of the system on the cooling cycle the switch contacts 59b should be closed to keep the indoor fan in operation. The compressor 15 continues to operate pulling heat out of the stored-up refrigerant in the indoor coil and putting this heat in the outdoor coil, raising the temperature of the outdoor coil to melt the accumulated frost and dry the residual moisture thereon. This action is accelerated by stopping the outdoor fan. As the frost on the outdoor coil is melted and residual moisture evaporated, the pressure in the outdoor coil rises until it reaches the preset value of approximately 170 p.s.i. at which time the defrost pressure switch 58 is closed completing the circuit to the defrost relay 56 through the now closed contacts 50, the switch 58 and the closed relay contacts 26b. Experience has shown that a rise in the pressure in the outdoor coil to a level of 170 p.s.i. indicates the absence of frost and residual moisture on the outdoor coil.

The effect of the energization of the defrost relay 56 is to complete circuits around the timed contacts 48 and the pressure switch 58 through the relay contacts 56b and 56a, respectively. The closing of the contacts 56b re-energizes the outdoor fan motor 34 and energizes the change-over valve moving it to the heating cycle position thus returning the system to its normal heating function. The time for the completion of the defrosting action will be a direct function of the amount of frost and residual moisture accumulated on the outdoor coil as the precise pressure is not reached if the coil is wet. Thus the invention produces a defrost and moisture disposal cycle, the time of which is automatically and precisely varied to meet the needs of the system.

The clock operated cams are so arranged as to maintain the contact 48 open and the contacts 50 and 52 closed for a preset period of four minutes in a typical case. Since the contacts 52 are in series with the clock, the clock will continue to operate even though the defrost cycle has been completed. At the end of the four minute period, the cams will permit the contacts 48 to close and will restore the contacts 50 and 52 to their normally open position thus restoring the system to its initial condition and re-setting the cycle for the next defrost period. Closing of the contact 48 assures resumption of the normal heating cycle and limits the defrost cycle to about four minutes regardless of the condition of the outdoor coil. This prevents locking the system in the defrost mode which might otherwise occur under unusual ambient conditions.

While it has been stated that the pressure switch 58 is set to close as a pressure of 170 p.s.i. and to open at 100 p.s.i. and that the clock normally establishes a period of thirty minutes between defrost cycles and a maximum period of four minutes for any defrost cycle moisture disposal, it will be understood that these values can be varied as required to meet the needs of a particular environment or installation thus giving the system considerable flexibility in operation.

Instead of a single large compressor in the larger heat pumps, there may be a number of smaller compressors. The multi-compressor system has several important advantages. For example, the cost of several small units is less than the cost of a single large compressor. The smaller units may be stated successively to thereby reduce the starting current and improve the characteristics of the installation. They provide greater flexibility of operation since under light loads some of the compressors can be de-energized. Multiple units are usually quieter than a single large unit. Finally, in case of a breakdown of the compressor the operation of the heat pump can be continued while the disabled compressor is removed for repair.

Figure 3:
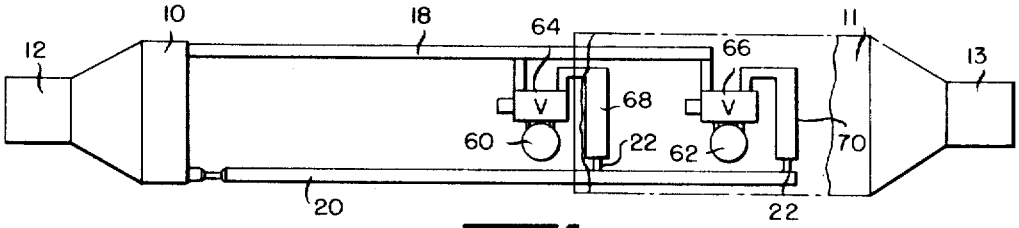
FIGURE 3 illustrates diagrammatically a modified heat pump unit to which the control system of the present invention may be applied.

The heat pump assembly of FIGURE 3 is essentially the same as the heat pump assembly of FIGURE 1, except that in the system of FIGURE 3 two compressor-coil assemblies have been substituted for the single compressor-coil assembly of the latter. The compressors indicated at 60 and 62 are provided with respective change-over valves 64 and 66 and respective coils 68 and 70. As shown in FIGURE 3 the compressors and associated change-over valves and coils are connected in parallel to the indoor coil 10 by main refrigerant lines 18 and 20 and 18a and 20a.

Figure 4:
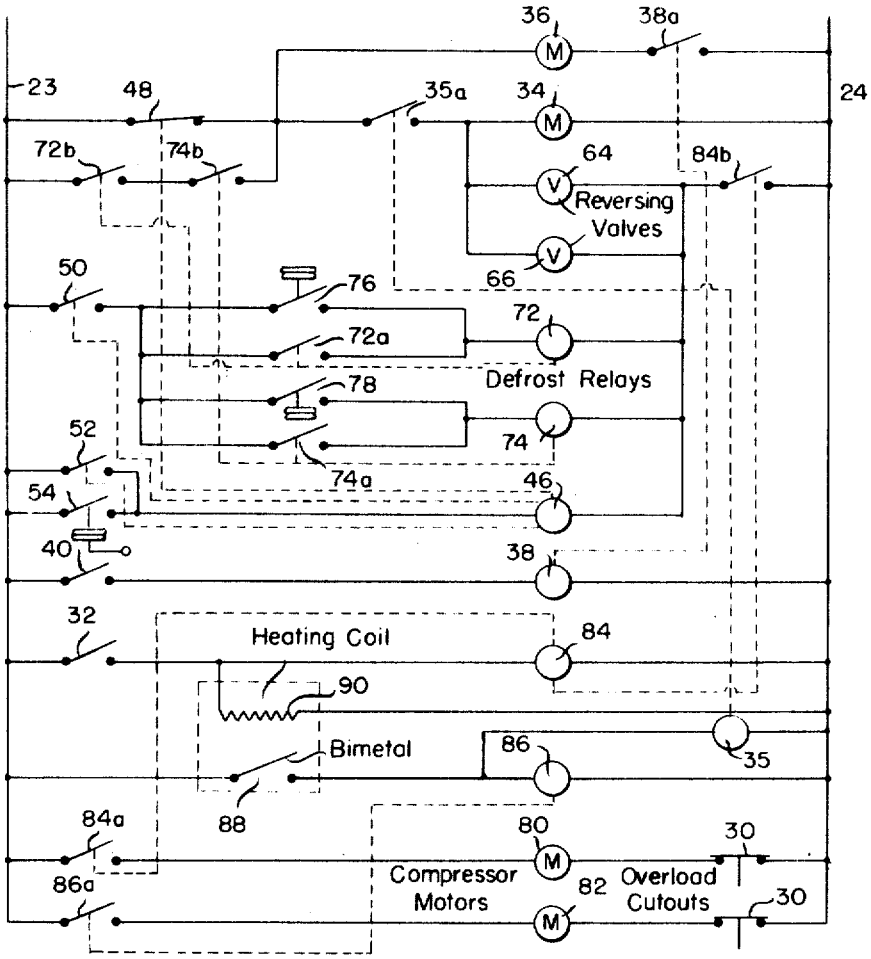
FIGURE 4 is a circuit diagram applicable to the unit of FIGURE 3.

The control system of FIGURE 4 is essentially the same as that of FIGURE 2 except for the duplication of certain elements. For example, in lieu of the single relay 56 separate relays 72 and 74 are provided and are arranged in parallel. The relay 72 operates contacts 72a and 72b and the relay 74 operates normally open contacts 74a and 74b. Separate pressure switches 76 and 78 are provided which are responsive respectively to the pressures of the refrigerant in the coils 68 and 70. It will be noticed that the contacts 72b and 74b are in series so the defrost cycle will not terminate until both coil units are defrosted and dried or until a predetermined time, i.e., four minutes has elapsed. The compressors 60 and 62 are operated by motors 80 and 82, respectively, in series with relay contacts 84a of relay 84 and 86a of relay 86. Contacts 84b operated by relay 84 replace contacts 26b. The relay 84 is in series with the room thermostat 32 whereas the relay 86 is in series with a warp switch 88 which is closed by a heating coil 90 connected in parallel with a relay 84. This arrangement provides sequential starting of the compressor motors 80 and 82 to reduce the required starting current and improve the electrical characteristics of the installation. The operation of this circuit is the same as the operation of the circuit of FIGURE 1. That is, the defrost cycles are initiated by the clock operated contacts and are discontinued by the pressure switch contacts or the expiration of a predetermined time.

Figure 5:
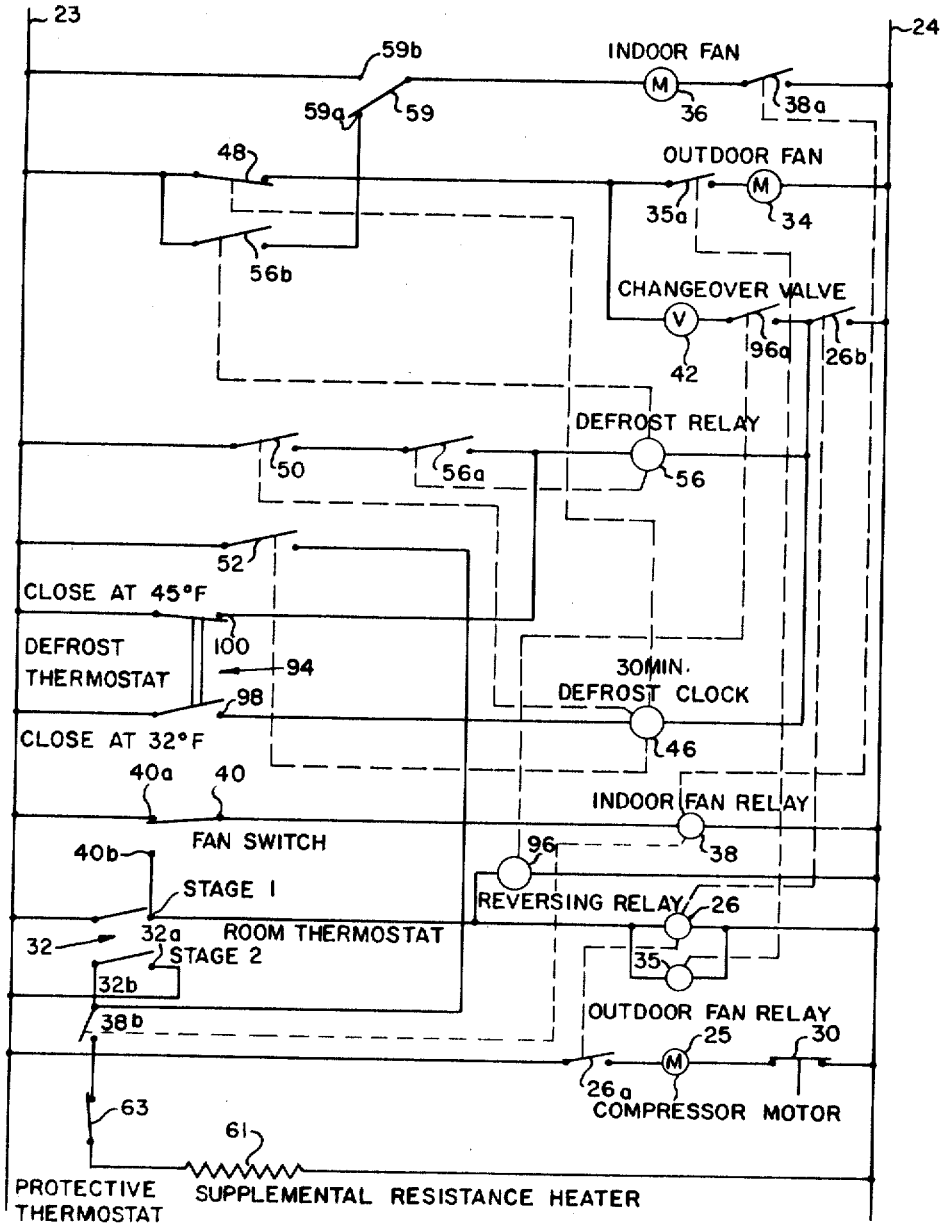
FIGURE 5 illustrates diagrammatically another control circuit for the apparatus of FIGURE 1.
Figure 8:
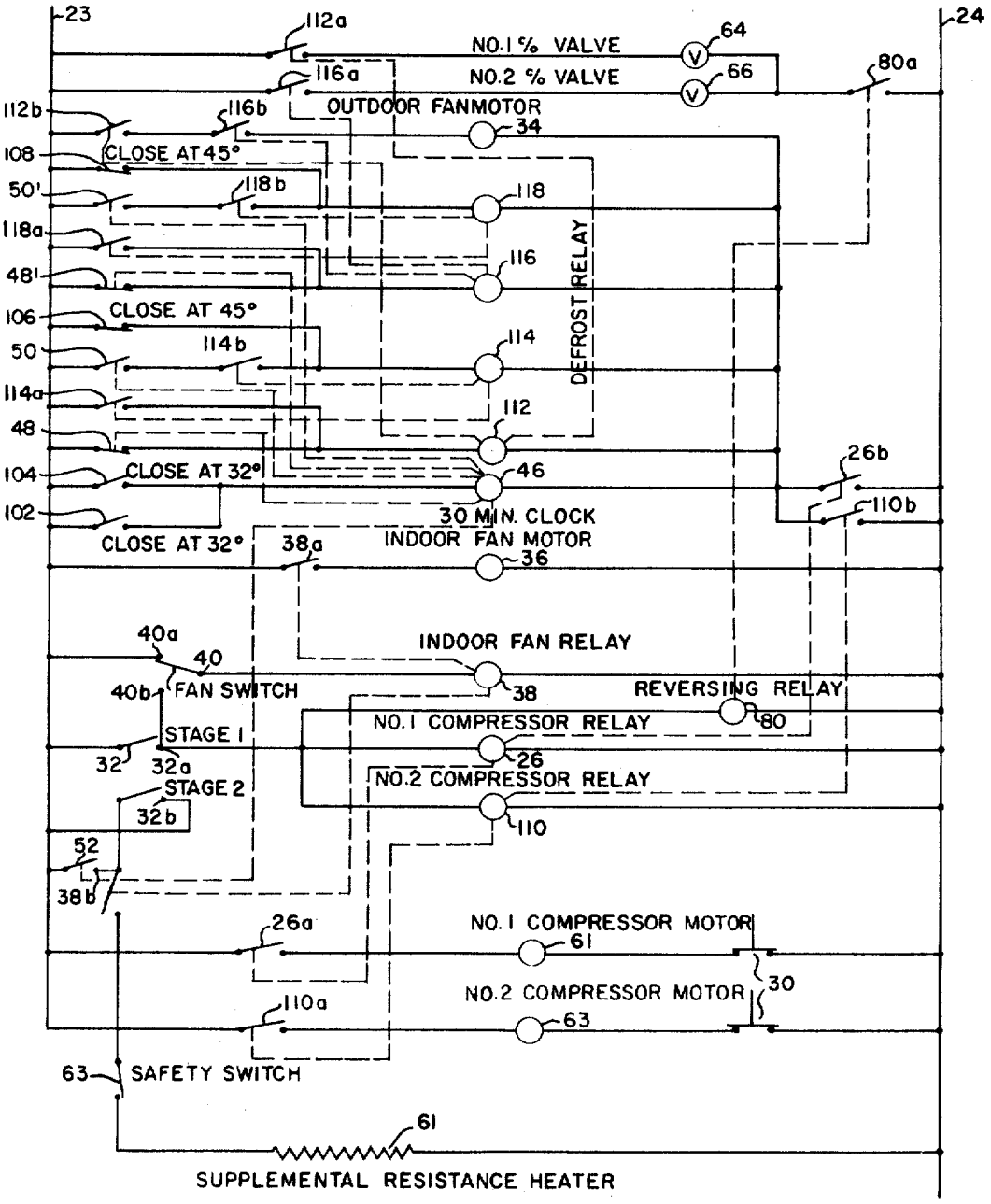

FIGURES 5 and 6, to which detailed reference will now be made, illustrate slightly modified forms of the control systems applicable to the single compressor system of FIGURE 1 and the multiple compressor system of FIGURE 2, respectively. The control systems of FIGURES 5 and 6 are essentially the same as those of FIGURES 2 and 4, respectively, the principal difference being that in the systems of FIGURES 5 and 6 the defrost cycle is terminated by means responsive to the temperature of the outside coil rather than the pressure of refrigerant in the outside coil. As in the previously described embodiments, the control systems of FIGURES 5 and 6 are effective to initiate the defrost cycle by a clock which is operated only when the compressor or compressors are in operation and conditions are such that the accumulation of frost on the outdoor coil is likely. The defrost cycle is terminated and the system is restored to normal operation when the outside coil is defrosted and dried or after a preset time has elapsed.

The systems of FIGURES 5 and 6 are somewhat simpler in construction than the previously described embodiments are of correspondingly reduced cost and eliminate the likelihood of refrigeration leaks which may be caused by the installation of the pressure responsive switch in the outdoor coil. Also, experience has shown that with the systems of FIGURES 5 and 6, the advent of frosting conditions can be predicted with greater accuracy by measuring the temperature of the outdoor coil rather than relying on ambient temperature to provide a defrost signal. More specifically, the defrost clock is operated when the coil temperature drops to 32° F. when it is known that it is possible for frost to occur. In the previously described embodiment the timer mechanism was operated when the ambient temperature dropped to 45° F. since experience has shown that at an ambient temperature of 45° F. the coil temperature is at or near 32° F. That is, the system of FIGURES 5 and 6 measure the critical condition directly whereas the systems of FIGURES 2 and 4 measure the critical condition indirectly.

However, the systems of FIGURES 2 and 4 have certain advantages over the systems of FIGURES 5 and 6, for example, the pressure sensitive system assures a more positive discontinuation of the defrost cycle and provides positive protection against excessive head pressure which might otherwise be developed during the defrost cycle. Thus, use of a particular system will depend upon the ambient or environmental conditions expected to be encountered in the installation and to some extent upon the personal preference of the user.

Referring now more particularly to FIGURE 5, this system is essentially the same as FIGURE 2 except for the substitution of a defrost thermostat assembly 94 for the pressure switch assembly 58 and the addition of the reversing relay 96 having a contact 96a in series with the change-over valve 42. The reversing relay 96 is connected in parallel with the outdoor fan relay 35 and the compressor relay 26. The thermostat assembly 94 includes a contact 98 which is closed when the coil temperature is 32° F. or less an a contact 100 which is closed when the temperature of the outdoor coil is 45° F. or more. The contacts 98 and 100 are mechanically connected so that one contact is always closed. More specifically, contact 98 will not open until contact 100 is closed when the temperature reaches 45° F. Conversely, contact 100 will not open until contact 98 is closed by a fall in temperature to 32° F.

The operation of the system of FIGURE 5 will now be described first assuming normal operation of the heat pump on the heating cycle with the outdoor coil temperature above 32° F. Under these conditions it is known that there is no danger of accumulation of frost on the outdoor coil. The indoor heating thermostat 32 will close whenever heat is desired, energizing the compressor relay 26, the outdoor fan relay 35 and the reversing relay 96 to place the system in normal operation in the heating cycle. At the same time contact 40a of the manual fan switch 40 will be closed energizing the fan relay 38 thereby energizing the indoor fan motor. If the temperature of the coil is above 45° F. the defrost relay 56 will also be energized. However, this has no effect on the system. Thermostat contacts 98 will be open and the defrost clock 46 will not be energized and the system will continue on the heating cycle indefinitely until the requirements for heat have been satisfied at which time the contacts of the thermostat 32 will open to discontinue operation of the system except for the indoor fan which will continue to run until the switch 40 is opened manually. Alternately, by closing contacts 40b and 59b, the indoor fan may be made to operate only when the thermostat 32 is closed.

When the heat pump is being operated on the heating cycle and the outdoor coil temperature drops below 32° F. the contact 98 will be closed to energize the defrost clock 46 and the contact 100 will be opened de-energizing the defrost relay 56. As explained before, the energization of clock 46 will produce no change in the operation of the system until the clock has run for a total of thirty minutes after the completion of the previous defrost cycle. When this time has elapsed the clock will operate a cam to open contact 48 and close contacts 50 and 52. The closing of the contact 52 causes operation of the supplemental resistance heater 61 during the defrost period provided the indoor fan relay contacts 38b are closed. When timed contact 48 is opened by the clock the operation of the outdoor fan motor 34 is discontinued and the circuit to the change-over valve to shift to the cooling cycle position. The compressor continues to operate transferring heat from the indoor coil to the outdoor coil raising the temperature of the outdoor coil to melt the accumulated frost and dry the residual moisture on the coil. The action is accelerated by stopping the outdoor fan.

Experience has shown that the outdoor coil must be free of frost and residual moisture before it can reach a temperature of 45° F. When this temperature has been reached, the contact 100 is closed and the contact 98 is simultaneously opened thus completing a circuit to the defrost relay 56. The closing of the contact 56b by relay 56 re-energizes the outdoor fan motor 34 and the change-over valve 42, moving it to the heat cycle position thus returning the system to its normal heating function.

When the system is returned to normal heat cycle operation it may be that the ambient temperatures are such that the outdoor coil temperature will rapidly fall to 32° F. or below thus closing contact 98 and opening contact 100. The system will continue in its normal heating cycle however, since a parallel circuit has been established to energize the defrost relay 56 through relay contacts 56a and timed contacts 50.

The clock operated cams are so arranged as to maintain the contact 48 open and the contacts 50 and 52 closed for a preset period of 4½ minutes in a typical case. Since the thermostatic contact 98 is in series with the clock 46 the clock 46 will continue to operate throughout the defrost cycle as long as the temperature of the outdoor coil is below 45° F. At the end of the 4½ minute period the cams will permit the contacts 48 to close and will open the contacts 50 and 52 thus restoring the system to its intial condition and re-setting the cycle for the next defrost period even if the temperature of the outdoor coil does not rise to 45° F. in 4½ minutes.

This provides an important protective feature for the system and prevents the system from becoming "locked in" the defrost mode under unusual ambient conditions.

FIGURE 6 discloses a system for controlling the defrost cycle of a multi-compressor unit such as that shown in FIGURE 3 and is generally similar to the system of FIGURE 4 except for the substitution of the thermostatic contacts 102 and 104, 106 and 108. Contacts 102 and 106 which are mechanically connected in the same manner as contacts 98 and 100 are arranged to sense the temperature of one of the outside coils and contacts 104 and 108 which are similarly connected, are arranged to sense the temperature of the other outside coil. The contacts 102 and 104 close when the temperature of the associated coil falls to 32° F. (opening contacts 106 or 108) and the contacts 106 and 108 close whenever the temperature of the associated coil is above 45° F. (opening the contacts 102 and 104).

The system is so arranged that when either one of the contacts 102 or 104 is closed the defrost clock 46 will be energized if one of the compressors 60 or 62 is in operation. The clock will move through its thirty minute time period and then place both circuits of the heat pump into the defrost mode by de-energizing the change-over valve solenoids 68 and 70 and shutting down the outdoor fan motor 34. Thus, either or both of the thermostatic contacts 102 and 104 can initiate the defrost operation.

The defrost operation will continue until one or both of the thermostatic contacts 106 or 108 closes sensing the rise in temperature above 45° F. of its associated coil indicating that the coil has been defrosted and dried. When either of the contacts 106 or 108 is closed the change-over valve for that system is energized thus restoring it to the heating mode of operation. When both systems have been restored to heating, the outdoor blower motor 34 is re-energized and normal heating operation is resumed. The compressor operate continuously throughout the entire defrost cycle.

As in the previously described system it is an important feature that if for some reason the outdoor coils never reach 45° F. and are thus unable to take the heat pump out of the defrost mode the clock will restore the heat pump to its normal heating operation after approximately 4 to 4½ minutes in the defrost mode. This prevents the heat pump from locking in the defrost mode as may occur in prior systems.

In addition to the components previously discussed, the system of FIGURE 6 includes an additional compressor relay 110 with its contacts 110a and 110b, a relay 112 having contacts 112a and 112b, relay 114 having contacts 114a and 114b, relay 116 having contacts 116a and 116b, and relay 118 having contacts 118a and 118b.

Considering the system in greater detail, if either of the thermostatic element 102 or 104 close, the timer clock 46 will be energized providing that either or both of the compressors are operating and thus either contacts 26b or 110b are closed. After a total of thirty minutes of operation under these conditions the clock will open switch contacts 48, 48' and will close switch contacts 50, 50' and 52. Opening of contact 48 de-energizes the relay 112 opening contacts 112a and 112b, the former de-energizing the change-over valve 64 to place the valve in the defrost or cooling position. Similarly, the opening of switch contact 48' de-energizes relay coil 116 opening contacts 116a and 116b, the opening of the former de-energizing the change-over valve 70 placing that refrigerant system in the defrost mode. The opening of either of the contacts 112b or 116b de-energizes the outdoor fan motor 34. Contact 80a of the reversing relay 80 is closed throughout all heating and defrosting operations.

The defrost operation continues until one of the thermostatic elements on the outdoor coil reaches a temperature of 45° F. Assuming that the coil associated with contact 106 has reached this temperature contact 106 will close and open the contact 102. The closing of contact 106 energizes relay 114 thus closing contacts 114a and 114b. Since the clock 46 has previously closed switch contact 50, the closing contact 114b energizes the coil 114 independently of the contact 106. The closing of the relay contact 114a energizes the coil 112 thus closing contacts 112 and 112b, the former energizing the change-over valve 64 restoring the valve to the heating operation position. Similarly, when thermostatic contact 108 closes (opening contact 104) relay 118 will be energized (closing contacts 118a and 118b). Closing contact 118a energizes coil 116 closing contacts 116a and 116b, the former restoring the change-over value 66 to the heating position and the latter energizing the outdoor fan 34. The entire system is now back in the normal heating operation.

From the foregoing it will be apparent that all forms of the invention are effective to provide, in a single compresor or multi-compressor heat pump unit, a defrost cycle which is initiated as a function of the time the system has operated under conditions which actually require defrost and in which the defrost cycle is terminated when defrosting has been completed as indicated by a rise in the temperature or pressure of the outdoor coil or at the expiration of a predetermined period of time. Accordingly, all forms of the control systems herein disclosed provide for defrost only when it is required and for full protection to the system against "locking in" the defrost mode.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A control for defrosting a heat pump operating on a heating cycle, said heat pump having indoor and outdoor coils, compressor means for circulating refrigerant through said coils and a valve means for connecting the delivery side of said compressor means to said indoor coil on the heating cycle or to said outdoor coil for cooling or defrosting comprising: a clock mechanism for registering the time of operation of said compressor means, means for preventing the operation of said clock except when the outdoor ambient temperature is below the level at which frost accumulates on said outdoor coil, means energized when said clock registers a predetermined accumulated time for operating said valve means to connect the delivery side of said compressor means to said outdoor coil to heat said outdoor coil, and means responsive to a rise in the pressure of refrigerant in said outdoor coil to reverse said valve means to again connect the delivery side of said compressor means to said indoor coil.

2. A control for defrosting a heat pump operating on a heating cycle, said heat pump having indoor and outdoor coils, compressor means for circulating refrigerant through said coils and change-over valve means for connecting the delivery side of said compressor means to said indoor coil on the heating cycle or to said outdoor coil for cooling or defrosting comprising: an electric clock for registering the time of operation of said compressor means, a thermostatic switch in series with said clock, the contacts of said switch being open except when the outdoor ambient temperature is below the level at which frost accumulates on said outdoor coil, means energized when said clock registers a predetermined accumulated time for operating said change-over valve means to connect the delivery side of said compressor means to said outdoor coil to heat said outdoor coil for removing the frost and moisture thereon, and means, responsive to a rise in the pressure of refrigerant in said outdoor coil to reverse said valve means to again connect the delivery side of said compressor means to said indoor coil.

3. A control for defrosting a heat pump operating on a heating cycle, said heat pump having indoor and outdoor coils, a motor driven fan for moving air over said outdoor coil, compressor means for circulating refrigerant through said coils, and solenoid operated change-over valve means for connecting the delivery side of said compressor means to said indoor coil on the heating cycle or to said outdoor coil for cooling or defrosting comprising: an electric clock mechanism for registering the time of operation of said compressor means, a thermostatic switch in series with said clock, the contacts of said switch being open except when the outdoor ambient temperature is below the level at which frost accumulates on said outdoor coil, a normally closed clock operated switch in series with said fan motor and said change-over valve means, means for opening said normally closed switch when said clock registers a predetermined accumulated time for operating said valve means to connect the delivery side of said compressor means to said outdoor coil to heat said outdoor coil and remove the front and moisture thereon, and to de-energize said fan motor, and means responsive to a rise in the pressure of refrigerant in said outdoor coil to reverse said valve to again connect the delivery side of said compressor means to said indoor coil and to re-energize said fan motor.

4. A control for defrosting a heat pump operating on a heating cycle, said heat pump having indoor and outdoor coils, a motor driven fan for moving air over said outdoor coil, compressor means for circulating refrigerant though said coils, and solenoid operated change-over valve means for connecting the delivery side of said compressor means to said indoor coil on the heating cycle or to said outdoor coil for cooling or defrosting comprising: an electric clock for registering the time of operation of said compressor means, a thermostatic switch in series with said clock, the contacts of said switch being open except when the outdoor ambient temperature is below the level at which frost accumulates on said outdoor coil, a normally closed clock operated switch in series with said fan motor and said change-over valve means, means operated when said clock registers a predetermined accumulated time for opening said normally closed switch to operate said valve means to connect the delivery side of said compressor means to said outdoor coil to heat said outdoor coil and to de-energize said fan motor, normally open switch contacts in parallel with said clock operated switch, and means responsive to a rise in the pressure of refrigerant in said outdoor coil to close said normally open switch contacts to reverse said change-over valve means to again connect the delivery side of said compressor means to said indoor coil and to re-energize said fan motor.

5. A control for defrosting a heat pump operating on a heating cycle, said heat pump having indoor and outdoor coils, compressor means for circulating refrigerant through said coils and a valve means for connecting the delivery side of said compressor means to said indoor coil on the heating cycle or to said outdoor coil for cooling or defrosting comprising: a clock mechanism for registering the time of operation of said compressor means, means for preventing the operation of said clock except when the outdoor ambient temperature is below the level at which frost accumulates on said outdoor coil, means energized wihen said clock registers a predetermined accumulated time for operating said valve means to connect the delivery side of said compressor means to said outdoor coil to heat said outdoor coil, means responsive to a rise in the pressure of refrigerant in said outdoor coil to reverse said valve means to again connect the delivery side of said compressor means to said indoor coil, an auxiliary electrical heater positioned adjacent said indoor coil and means for energizing said heater when the delivery side of said compressor means is connected to said outdoor coil and the indoor temperature is below a predetermined level.

6. A control mechanism for defrosting a heat pump operating on a heating cycle, said heat pump having indoor and outdoor coils, compressor means for circulating refrigerant through said coils and valve means for connecting the delivery side of said compressor means to said indoor coil on the heating cycle or to said outdoor coil for cooling or defrosting comprising: a clock mechanism, means for energizing said clock only when [said compressor is in operation and] the outdoor ambient temperature is below the level at which frost accumulates on said outdoor coil; means energized when said clock registers a predetermined accumulated time for operating said valve means to connect the delivery side of compressor means to said outdoor coil to heat said outdoor coil, and means responsive to a rise in the pressure of refrigerant in said outdoor coil to reverse said valve means to again connect the delivery side of said compressor means to said indoor coil.

7. A control for defrosting a heat pump operating on a heating cycle, said heat pump having indoor and outdoor coils, compressor means for circulating refrigerant through said coils and valve means for connecting the delivery side of said compressor means to said indoor coil on the heating cycle or to said outdoor coil for cooling or defrosting comprising: a clock mechanism, means for operating said clock mechanism only when [said compressor is in operation and] the outdoor ambient temperature is below the level at which frost accumulates on said outdoor coil, switch means having a normal position and a defrost position, first control means energized when said clock registers a predetermined accumulated time for moving said switch means from said normal position to said defrost position to thereby operate said valve means to connect the delivery side of said compressor means to said outdoor coil, and additional control means responsive to a rise in the pressure of the refrigerant in said outdoor coil to reverse said valve means to connect the delivery side of said compressor means to said indoor coil, said first control means being effective to restore said switch means to said normal position [to] a determined time interval after said switch means is moved to said defrost position in the event said pressure fails to rise in said predetermined time interval.

8. A control for defrosting a heat pump operating on a heating cycle, said heat pump having indoor and outdoor coils, compressor means for circulating refrigerant through said coils and a valve means for connecting the delivery side of said compressor means to said indoor coil on the heating cycle or to said outdoor coil for cooling or defrosting comprising: a clock mechanism [for registering the time of operation of said compressor means], means for preventing the operation of said clock except when frost accumulates on said outdoor coil, means energized when said clock registers a predetermined accumulated time for operating said valve means to connect the delivery side of said compressor means to said outdoor coil to heat said outdoor coil, and *control* means responsive to a [rise in the temperature of] *condition of the* refrigerant in said outdoor coil *indicative of the removal of frost from said outdoor coil* to reverse said valve means to again connect the delivery side of said compressor means to said indoor coil, means for maintaining said clock in operation when the delivery side of said compressor is connected to said outdoor coil, and means responsive to the continued operation of said clock to reverse said valve means to connect the delivery side of said compressor means to said indoor coil *a predetermined time after the delivery side of said compressor means is connected to said outdoor coil in the event said control means does not function in said predetermined time.*

9. A control for defrosting a heat pump operating on a heating cycle, said heat pump having indoor and outdoor coils, compressor means for circulating a refrigerant through said coils and valve means for connecting the delivery side of said compressor means to said indoor coil on the heating cycle or to said outdoor coil for cooling or defrosting comprising: a clock mechanism, means for operating said clock mechanism only when [said compressor is in operation and] frost accumulates on said outdoor coil, switch means having a normal position and a defrost position, first control means energized when said clock registers a predetermined accumulated time for moving said switch means from said normal position to said defrost position to thereby operate said valve means to connect the delivery side of said compressor to said outdoor coil, and additional control means responsive to [a rise in the pressure or temperature of] *a condition of* the refrigerant in said outdoor coil *indicative of the removal of frost from said outdoor coil* to reverse said valve means to connect the delivery side of said compressor means to said indoor coil, said first control means being effective to restore said switch means to said normal position a predetermined time interval after said switch means is moved to said defrost position in the event said [pressure or temperature fails to rise] *said additional control means does not act* in said predetermined time interval.

10. A control for defrosting a heat pump operating on a heating cycle, said heat pump having indoor and outdoor coils, compressor means for circulating refrigerant through said coils and a valve means for connecting the delivery side of said compressor means to said indoor coil on the heating cycle or to said outdoor for cooling or defrosting comprising: a clock mechanism [for registering the time of operation of said compressor means], means for preventing the operation of said clock except when the temperature of the outdoor coil is below the level at which frost accumulates on said outdoor coil, means energized when said clock registers a predetermined accumulated time for operating said valve means to connect the delivery side of said compressor means to said outdoor coil to heat said outdoor coil, means responsive to a rise in the temperature of refrigerant in said outdoor coil to reverse said valve means to again connect the delivery side of said compressor means to said indoor coil, means for maintaining said clock in operation when the delivery side of said compressor is connected to said outdoor coil, and means responsive to the continued operation of said clock to reverse said valve means to connect the delivery side of said compressor means to said indoor coil *a predetermined time after the delivery side is connected to said outdoor coil if said temperature fails to rise in said predetermined time.*

11. A control for defrosting a heat pump operating on a heating cycle, said heat pump having indoor and outdoor coils, compressor means for circulating refrigerant through said coils and valve means for connecting the delivery side of said compressor means to said indoor coil on the heating cycle or to said outdoor coil for cooling or defrosting comprising: a clock mechanism, means for operating said clock mechanism only when [said compressor is in operation and] the temperature of the outdoor coil is below the level at which frost accumulates on said outdoor coil, switch means having a normal position and a defrost position, first control means energized when said clock registers a predetermined accumulated time for moving said switch means for said normal position to said defrost position to thereby operate said valve means to connect the delivery side of said compressor means to said outdoor coil, and additional control means responsive to a rise in the temperature of the refrigerant in said outdoor coil to reverse said valve means to connect the delivery side of said compressor means to said indoor coil, said first control means being effective to restore said switch means to said normal position a predetermined time interval after said switch means is moved to said defrost position in the event said temperature fails to rise in said predetermined time interval.

References Cited

The following references, cited by the Examiner, are of record in the patented file of this patent or the original patent.

UNITED STATES PATENTS

| | | | |
|---|---|---|---|
| 2,847,833 | 8/1958 | Movick | 62—155 |
| 2,934,323 | 4/1960 | Burke | 165—12 |

ROBERT A. O'LEARY, *Primary Examiner.*

C. SUKALO, *Assistant Examiner.*

U.S. Cl. X.R.

62—155, 160, 234; 165—29

UNITED STATES PATENT OFFICE
CERTIFICATE OF CORRECTION

Reissue No. 26,596 June 3, 1969

Harry W. Jobes

It is certified that error appears in the above identified patent and that said Letters Patent are hereby corrected as shown below:

In the heading to the printed specification, lines 3 to 5, "assignor to Hupp Corporation, Cleveland, Ohio, a corporation of Delaware" should read -- assignor to White Consolidated Industries, Inc., a corporation of Delaware --. Column 5, line 36, "as" should read -- at --; line 49, "stated" should read -- started --. Column 7, line 6, "an" should read -- and --; line 58, "The" should read -- This --. Column 8, line 46, "the" should read -- that --; line 52, "compressor" should read -- compressors --; line 54, "system" should read -- systems --. Column 9, line 18, after "closing" insert -- of --; line 38, after "Ac" insert a hyphen. Column 11, line 5, "wihen" should read -- when --. Column 12, line 45, after "outdoor" insert -- coil --. Column 13, line 4, "for", second occurrence, should read -- from --.

Signed and sealed this 5th day of May 1970.

(SEAL)
Attest:

EDWARD M.FLETCHER,JR.
Attesting Officer

WILLIAM E. SCHUYLER, JR.
Commissioner of Patents